United States Patent Office 3,113,972
Patented Dec. 10, 1963

3,113,972
PROCESS FOR PRODUCING A HIGHLY CONCENTRATED FORMALDEHYDE SOLUTION
Shinjiro Kodama, Sakyo-ku, Kyoto, Tatsuo Ando, Kaneko, Niihama-shi, and Seiichi Kitagawa, Ichikawa-shi, Japan, assignors to Sumitomo Chemical Company, Ltd., Osaka, Japan, a corporation of Japan
Filed Feb. 4, 1959, Ser. No. 791,221
2 Claims. (Cl. 260—603)

This invention relates to methods of producing a solution containing highly concentrated formaldehyde from a formaldehyde-containing gas obtained by a catalytic conversion of methanol.

Formalin is produced by conventional techniques as follows: methanol is converted by using an oxygen-containing gas as a conversion gas, which is then introduced into an absorber; the gas is absorbed therein by an absorbing solution circulating at or near ambient temperature; the remaining gas is passed to a final absorber wherein it is absorbed in water to produce a diluted formalin. The circulating absorbing solution has a composition similar to that of a commercial formalin, a part of which is continuously withdrawn from the circulating system and, if necessary, adjusted with respect to its composition by such means as distilling off methanol, restoring methanol, and controlling the formaldehyde content and the like to produce a commercial formalin. The amount of the circulating solution may be maintained at a predetermined level by continuously supplying the circulating system with an amount of water corresponding to that withdrawn from the system or a diluted aqueous solution of formaldehyde obtained in the final absorber.

Solid formaldehyde polymer has heretofore been produced by concentrating under reduced pressure a formaldehyde solution obtained as indicated above and having a composition similar to that of a commercial formalin until the solidification or precipitation of the polymer occurs. However, in distilling off water or methanol to effect the necessary concentration, a large amount of formaldehyde is entrained in the distillate so that a large amount of diluted formalin is produced besides the solid formaldehyde polymer (paraformaldehyde), and the yield of paraformaldehyde is thus reduced.

It is evident that the conventional process is very roundabout, since in the course of production a large amount of water is used to absorb formaldehyde from the methanol-converted gas and such water must be then removed by distillation. Moreover, from an economical point of view, the process is quite costly since, for example, the heat generated by the oxidation of the methanol is not utilized and additionally a large amount of heat must be additionally supplied.

It is an object of this invention to provide a simple method of producing a highly concentrated formaldehyde-containing solution directly from a methanol-converted gas without the necessity of using a distilling operation for the above-indicated concentration. It is another object of this invention to produce a solid formaldehyde polymer in a simple and economical manner by the provision of a method of obtaining the above described formaldehyde-containing solution. It is a further object of this invention to provide a simple and economical method of obtaining the described formaldehyde-containing solution from the catalytically converted gas wherein formalin of a desired formaldehyde concentration with or without a content of methanol may be obtained from the residual gas. Thus all formaldehyde in the gas is recovered for the formaldehyde solution. It is an additional object of this invention to provide an improved commercial process in which all of the methanol may be recovered for reuse.

According to the invention, there is provided a method which comprises subjecting to partial condensation or absorption at temperatures of more than 50° C., and preferably 55° to 90° C., a substantially equivolumetric mixture of methanol and air and an unreacted methanol-containing gas obtained by catalytical conversion at 450° to 700° C., and recovering a condensate composed of formaldehyde, water and methanol having at least 50% by weight of formaldehyde.

Reference has been made to the terms partial condensation and absorption; however there is no substantial difference in meaning between these two terms with respect to the invention.

For the sake of convenience, the term partial condensation will be used in the case where the condensate is obtained by the cooling at the above temperatures. The term absorption is used where the condensate is circulated and contacted with converted gas within the above range of temperatures. The term cooling is used to cover both these cases.

In order that the invention may be fully understood, a preferred embodiment thereof will next be described with reference to the accompanying drawings in which.

Figure 1:
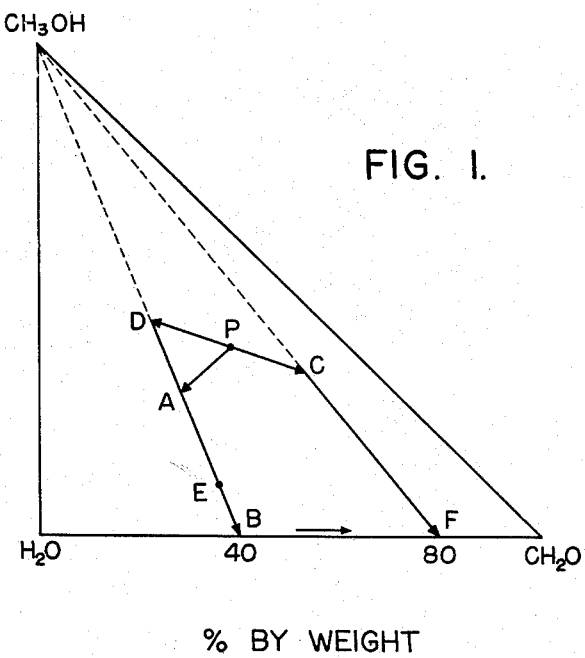
FIG. 1 is a triangular diagram of the formaldehyde-water-methanol ternary system for an explanation of the production of a formaldehyde polymer according to the invention.

Referring to FIG. 1, the composition of the methanol-converted gas is shown at P. In the conventional method of manufacturing a solid formaldehyde polymer at room temperature, a ternary composition as shown at A may be first obtained by causing water to absorb the conversion gas. The subsequent distilling course of methanol is shown as $A \rightarrow B$. The most common formalin available in market is the one shown at E

($CH_2O$ 37:$H_2O$ 53:$CH_3OH$ 10)

It will be understood that such commercial formalin may be obtained by distilling off methanol from the absorbing solution withdrawn from the circulating system. In order to obtain a solid formaldehyde polymer at room temperature, the distillation of methanol is continued further along the $A \rightarrow B$ line until it reaches B, from which composition water is driven out ($B \rightarrow F$) to obtain a formaldehyde polymer having the desired concentration.

In the method of the present invention, water is not added to the conversion gas but the converted gas is cooled at a temperature within the range from 55° C. to 90° C. A solution thus obtained is shown at C. Accordingly, a distillation of methanol from the C solution ($C \rightarrow F$) results in the recovery of the composition F. In addition, the solution D can be obtained by causing water to absorb the unabsorbed gas of the absorber, which solution may be converted to formalin E by rectifying the methanol.

In the method of the invention, the mixing ratio of the starting materials, i.e. methanol and air, is 40 to 53% by volume of methanol to 60 to 47% by volume of air. The mixture is catalytically converted by silver or copper at 450° to 700° C. The resulting gas is subjected to partial condensation at a temperature of at least 50° C., and preferably 55° to 90° C. In practical industrial use, condensate which is obtained by partial condensation within above range of temperature is made into an absorber and scrubbing is performed on converted gas within said range of temperature. A part of the increased condensate solution is continuously tapped off so that the amount of the solution to be circulated is maintained at a substantially constant level. In some cases, it is possible to obtain conversion gases of various compositions if the starting methanol gas is diluted with an inert gas such as nitrogen or steam and the like prior to the introduction into a converter or a catalyst such as silver, copper or the alloys thereof, or a metal oxide, such as molybdenum oxide, iron oxide and the like is selectively used. It has been found that any of these conversion gases may produce a highly concentrated formaldehyde solution if a proper absorbing temperature is used.

One of the most outstanding features of the present invention is that it makes it possible to obtain directly a highly concentrated aqueous formaldehyde solution by causing a circulating solution to absorb a formaldehyde-containing conversion gas obtained by conversion of methanol at high temperature (i.e., at least 50° C., and preferably 55° to 90° C.) which would not be expected by those skilled in the art. The second important feature of the invention which distinguishes itself from conventional methods is that no amount of water as such or in any form of solution is added to the absorbing system.

When the conversion gas is introduced into the absorbing solution, a component of the conversion gas is absorbed by the absorbing solution due to the difference between its partial pressure in the conversion gas and its equilibrium partial pressure on the circulating absorbing solution at the temperature at which absorption take place, and the water in the absorbing solution is only what comes from that contained in the conversion gas. Thus, as long as only the increments of the circulating solution caused by absorption are continuously drawn out, a highly concentrated aqueous formaldehyde solution with or without a content of methanol may be readily obtained.

In a practical commercial apparatus, a pressure fluctuation about 200 mm. Hg exist usually as the conversion gas must be forced to pass through the elements of the apparatus (such as an absorber, a washer and like) by suction or compression provided by a pump or a blower. Even at the constant partial condensation temperature, some fluctuation of the composition of the absorbing liquid cannot be avoided due to differences of pressure. When it is desired to keep a weight ratio of formaldehyde and water in the absorbing solution at 70:30, 80:20, or 90:10, the absorption may be effected at temperatures of about 55° C., 65° C. and 75° C., respectively. When it is desired to keep the weight ratio of $CH_2O$ and water at 82:18 in the case that the pressure inside the absorber is of the order of +50 mm. Hg, the use of a circulating absorbing solution having a temperature of about 70° C. is preferable. In any case, the absorbing temperature should be selected in accordance with the $CH_2O$ content of the formaldehyde solution to be obtained and the pressure inside the absorber. A solution having a high content of formaldehyde finds its own utility as a material for resin but it may be exclusively stripped of its all methanol by rectification, and all of the formaldehyde in the absorbing solution may be recovered in a form of an aqueous solution of formaldehyde. Such a highly concentrated aqueous formaldehyde solution has a particular solidifying temperature depending upon the content of formaldehyde. For example, it solidifies at about 55° C. when the content is 72%, and at about 92° C. when the content is 85%. Accordingly, if the solution is to be allowed to solidify by cooling at below the critical temperature, it can readily be made into a solid or semi-solid formaldehyde polymer at room temperatures.

A solution obtained by subjecting an "off" gas, namely a gas remaining after absorption of the methanol-converted gas, to total condensation or by supplying it with a small amount of water for absorption is solution having a very high content of methanol and formaldehyde. Thus, when the solution is subjected to a normal distillation as necessary to distil off a part or all of the methanol, a commercial formalin having 20 to 50% by weight of $CH_2O$ can readily be obtained.

As a further feature of the invention, formalin which is too dilute to use and as is produced in a conventional plant is not produced by the method of the invention.

Figure 2:
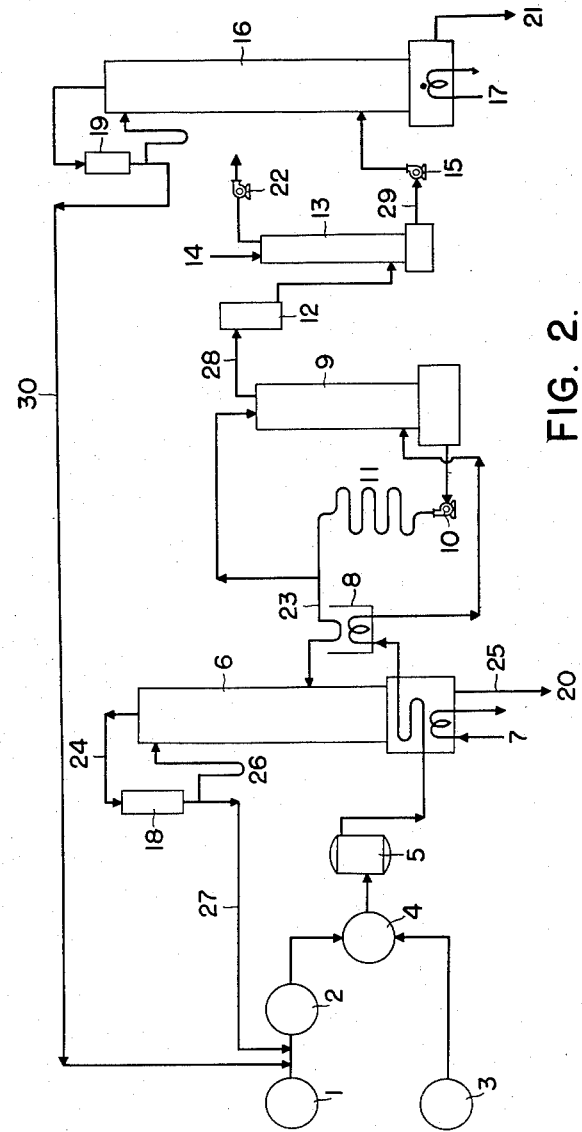
FIG. 2 is a flow sheet illustrating one embodiment of the invention in which the unabsorbed gas is used to produce formalin as by-product.

In FIG. 2, the starting material or methanol 1 which has been vaporized in an evaporator 2 is mixed with air 3 in a mixer 4 and passed to a converter 5 containing a conversion catalyst. In the converter, a major part of methanol is converted to formaldehyde. The heat of the resulting hot conversion gas is used as heat for a demethanolation rectifier 6 and for preheating in a heat-exchanger 8 an absorbing solution coming into the rectifier 6 while the conversion gas is cooled itself and introduced into an absorber 9. The absorber is provided with a circulating system having a cooler 11, through which the absorbing solution is circulated by a pump 10. The cooler 11 is intended for maintaining the absorbing solution at a predetermined temperature selected from a range between 55° and 90° C. When a part of the circulating solution is continuously withdrawn through a line 23, a highly concentrated formaldehyde containing solution may be continuously obtained as desired.

When it is desired to obtain a solid formaldehyde polymer as a product at room temperature, the circulating solution withdrawn through the line 23 is preheated by heat-exchange with the conversion gas at the heat-exchanger 8 and introduced into the rectifier 6 for rectification. A hot, highly concentrated aqueous solution of formaldehyde can thus be obtained from the bottom of the tower, which solution may readily be solidified, upon cooling through a line 25, to a normally solid formaldehyde polymer. A pure methanol is distilled off from the top of the rectifier 6 via a line 24, which is then liquidized in a condenser 18 with a part of it being recycled through a line 26 to the top of the rectifier 6. The remainder of the condensed methanol is returned through a line 27 to the evaporator 2 and again introduced into the conversion step together with the raw methanol. An off gas coming from the absorber 9 is passed through a line 28, cooled in a cooler 12 and then absorbed in an absorber 13 by the water introduced thereinto through a pipe 14. Waste gas is purged via a vacuum pump 22. The conversion gas is sucked through the system by the pump 22 such that formaldehyde will not leak out of the system. The absorbing solution is withdrawn through a pipe 29, passed through a pump 15 to a demethanolation rectifier 16 wherein it is stripped of the desired amount of methanol, and thereafter withdrawn from the bottom via a pipe 21 as formalin containing 20 to 50% by weight of formaldehyde. The behavior of methanol at the top of this rectifier is just the same as that of the rectifier 6, the former being connected with a condenser 19. A part of the methanol is continuously returned via a line 30 to the evaporator 2 and subjected to conversion together with the raw methanol. The references 7 and 17 show heat sources for the respective rectifiers.

The following examples are given by way of illustration and are not intended as limitation on the scope of this invention.

*Example 1*

A mixing gas of 179.2 m.³/hr. of methanol and 226.5 m.³/hr. of air was subjected to conversion at about 650° C. in the presence of a catalyst of silver, thus producing a conversion gas having the partial pressures 145 mm./Hg for formaldehyde, 80 mm./Hg for methanol, and 114 mm./Hg for water. The gas was continuously introduced into the lower part of the absorber 9 as shown in FIG. 2 wherein it was subjected to partial absorption in a countercurrent contact with a solution circulating by means of a pump 10. The condenser was a packing tower of 80 cm. in diameter and 300 cm. in height, and the temperature of the circulating solution was maintained at about 70° C. by the cooler 11. The total pressure of the converter was maintained at —100 mm. Hg by the suction pump. The composition of the circulating absorbing solution was $CH_2O$ 59%, $CH_3OH$ 29% and $H_2O$ 12% which was prepared at a rate of 150 kg./hr.

The circulating rate at the solution was kept at a constant level by continuously withdrawing the increments of the solution from the circulating system. The circulating solution withdrawn was preheated to 95° C. in the heat-exchanger 8 and introduced to the 30th stage of a bubble cup type rectifier 9 having thirty plates, wherein the methanol was distilled off at the top-of-tower temperature of 52.5° C. and under the reduced pressure of about —300 mm. Hg. The methanol condensed in the condenser 18 was returned as the feed methanol through the line 27 to the evaporator 2 at a rate of 435 kg./hr. A clear aqueous formaldehyde solution could be recovered from the bottom of the rectifier 6 through the line 25 at a rate of 106.5 kg./hr., which solution was cooled below about 85° C. and solidified to produce the corresponding amount of formaldehyde polymer having a $CH_2O$ content of 83.1%. Alternatively, the rectification to distil off methanol could be effected under ordinary pressures, in which case the top-of-tower temperature was 65° C.

The off gas coming through the line 28 from the absorber 6 was cooled by the next cooler 12 and introduced to the corresponding absorber 13. The absorber was a packing tower of 55 cm. in diameter and 300 cm. in height. When the gas was absorbed by water which was poured down through the line 14 at a rate of 13.2 kg./hr., 160.5 kg. of formalin having a composition of $CH_2O$ 28.9%, $H_2O$ 41.4%, $CH_3OH$ 29.7%. This was then passed through the line 29 and the pump 15 to the rectifier 16 having fifty plates wherein a part of methanol could be distilled off at the top-of-tower temperature of 65° C. under ordinary pressures. 125.4 kg. of formalin was recovered from the bottom having a composition of formaldehyde 37%, water 53% and methanol 10%. The methanol distilled off from the top of the rectifier was condensed in the condenser 19 and returned to the feed methanol system through the line 30 at a rate of 35 kg./hr.

*Example 2*

The same method and apparatus as in Example 1 were used to convert a mixing gas of methanol (178 m.³/hr.) and air (227 m.³/hr.) to a conversion gas, in which the partial pressures with respect to $CH_2O$, $CH_3OH$ and $H_2O$ were 135, 73 and 108 mm. Hg, respectively.

The conversion gas was introduced into the absorber 9, using the absorbing temperature of 60° C. 256.5 kg./hr. of circulating solution could be withdrawn as in Example 1. The composition of the produced solution in percent by weight was as follows: $CH_2O$ 55.5, $CH_3O$ 27.5, water 17.0.

Following a method of Example 1, the circulating solution was subjected to rectification under reduced pressure of —100 mm. Hg. 71 kg./hr. of methanol was returned to the feed methanol system from the top of the rectifier while a hot, clear aqueous formaldehyde solution having a composition of $CH_2O$ 76.5% by weight (100% yield) and water 23.5% by weight was obtained from the bottom of the rectifier. The upper limit of the solidifying temperature was about 62° C. This might be processed by a flaker into a flaky form, or introduced into a pelletizing tower wherein it was solidified and shaped into a form of pellets.

The off gas coming from the absorber 9 was also treated by a method similar to that of Example 1 to produce as a by-product 7.44 kg./hr. of commercial formalin composed of 37% $CH_2O$, 10% $CH_3OH$ and 53% water. 29.4 kg./hr. of methanol was distilled off from the rectifier and returned to the evaporator 2.

*Example 3*

Contrary to Examples 1 and 2 wherein the reduced pressure was used in the apparatus, this example illustrates the positive pressure used therein. The same method and apparatus as Example 1 were used except that instead of the suction pump 22 (FIG. 2), a blower was provided between the evaporator 4 and the converter 5. A mixing gas of 200 m.³/hr. of methanol and 255 m.³/hr. of air was converted to obtain a conversion gas in which the partial pressures of formaldehyde, methanol and water were 202, 73 and 134 mm./Hg, respectively the total pressure of gas was 810 mm./Hg.

The conversion gas was introduced into the absorber 9 using the absorbing temperature of 70° C. whereby 234 kg./hr. of circulating solution could be obtained. The solution had the following composition in percent by weight: $CH_2O$ 64, $CH_3OH$ 18 and water 18.

According to Example 1, the absorbing solution was passed to the rectifier 6 wherein it was rectified under the reduced pressure of —300 mm. Hg while 41.5 kg./hr. of methanol was distilled off and returned to the evaporator for reuse as the feed methanol.

From the bottom of the rectifier a hot, clear aqueous solution of formaldehyde could be recovered at a rate of 192 kg./hr. with a $CH_2O$ content of 78.1% (100% yield). The upper limit of the solidifying temperature thereof was about 72° C. Thus, it could become a solid product at room temperature or at temperatures below that point.

From the gas coming from the absorber 9 was obtained 105 kg./hr. of formalin as in Example 1 which meets the commercial standard of 37% $CH_2O$, 10% $CH_3OH$ and 53% water, while 15.2 kg./hr. of methanol was distilled off from the top of the rectifier and reused as the feed methanol.

*Example 4*

The gaseous mixture of 148 m.³/hr. methanol, 195 m.³/hr. air, and 62 m.³/hr. nitrogen was subjected to conversion at the converter 5 having in it silver catalyst maintained at about 500° C., under the reduced pressure of —100 mm. Hg, thereby obtaining gas which had such partial pressures of 149.0 mm. Hg for formaldehyde, 64.2 mm. Hg for methanol, and 106.0 mm. Hg for water. Same as in the case of Example 1, this gas was led continuously into the lower part of absorber 9 wherein it was circulated by the pump 10, and made to contact countercurrently the circulating liquid maintained at 65° C. by the cooler 11 thus to be absorbed. The circulating liquid consisted of formaldehyde 58.0%, methanol 26.6% and water 15.4% and was produced at the rate of 155 kgs. per hour. The increasing circulating liquid was continuously discharged from the circulating system so as to keep the amount of circulating liquid always constant, while the discharged liquid was preheated up to 95° C. at the heat exchanger 8 and then led into the rectifier 9 for rectification under the reduced pressure of —200 mm. Hg. From the top of the rectifier 41 kgs./hr. of methanol was obtained and returned to the evaporator 2, while hot, clear, aqueous solution of formaldehyde consisting of 79.0% of formaldehyde and 21.0% of water was obtained from the bottom of rectifier at the rate of 113.5 kgs. per hour. The upper limit of the solidifying temperature of this solution is about 75° C. Therefore, this solution can be made formaldehyde polymer solid under the room temperature by cooling it below the said 75° C.

By treating the off-gas from the absorber 9 in the same way as in the case of Example 1, 102 kgs. per hour of commercial formalin that consisted of formaldehyde 37%, methanol 10%, and water 53% was by-produced, whereas 7.5 kgs. per hour of pure methanol was distilled off the top of rectifier 16 and returned to the evaporator 2.

Example 5

Gaseous mixture of 186 m.³/hr. methanol and 219 m.³/hr. air was subjected to conversion at the converter 5 having in it copper-silver alloy catalyst maintained at about 550° C. under the reduced pressure of −100 mm. Hg, thereby obtaining such gas as has partial pressures of 166.0 mm. Hg for formaldehyde, 68.8 mm. Hg for methanol and 106.2 mm. Hg for water. This was continuously led into the lower part of absorber 9 same as in the case of Example 1 and made to counter-currently contact the circulating liquid maintained at 67% C. and pumped by the pump 10, for absorption. The circulating absorbing liquid was composed of 56.8% formaldehyde, 29.0% methanol and 14.2% water, and produced at the rate of 171 kgs. per hour. The increasing circulating liquid was discharged continuously from the circulation system so as to keep the amount of circulating liquid always constant, while the discharged liquid was preheated up to 95° C. at the heat exchanger 8 and then led into the rectifier 9 where it was rectified under the reduced pressure of −300 mm. Hg. 49.5 kgs. per hour pure methanol was distilled off the top of rectifier and returned to the evaporator 2, while 121.5 kgs. per hour of hot, clear, aqueous solution of formaldehyde consisting of 80.0% formaldehyde and 20.0% water was obtained from the bottom of rectifier. The upper limit of the solidifying temperature of the solution is about 77° C. Therefore, the solution can be made formaldehyde polymer of the same composition, solid at the room temperature, by cooling it below the said 77° C.

By treating the off-gas from the absorber 9 in the same way as in the case of Example 1, 175 kgs. per hour of marketable formalin consisting of formaldehyde 37%, methanol 10%, and water 53% was by-produced, while 4.5 kgs. per hour of pure methanol was distilled off the rectifier 16 and returned to the evaporator 2.

In the foregoing examples, the reference is made to the production of formalin consisting of 37% CH₂O, 10% CH₃OH and 53% water as a by-product from the absorber off gas, but it is also possible to obtain a formaldehyde-containing formalin of higher concentration by restricting the flow of water coming into the absorber or of lower concentration by adding more water thereto. In rectification, the total amount of methanol may be distilled off, or a large amount of methanol may be retained in formalin. In short, the composition of the by-product formalin may be modified as the particular plant conditions may require.

According to the invention, the production of a normally solid formaldehyde polymer may be effected in a more simplified and economical manner while a by-product formalin which is too dilute to use is not produced.

In a plant as shown in FIG. 2 in which all steps as herein described are combined, the total amount of formaldehyde in the conversion gas may be recovered at a concentration more than that of the commercial formalin while the total amount of methanol may be recycled for the production of formaldehyde.

The formaldehyde solution herein obtained may be referred to as containing methanol or not containing methanol, which is only based upon whether the conversion gas contains methanol or not.

What we claim is:

1. A method of producing a highly concentrated, hot, aqueous solution of formaldehyde which can be solidified to formaldehyde polymer at room temperature, which comprises catalytically oxidizing methanol in a conversion zone maintained at a temperature within the range of from 450° to 700° C. to form a gaseous mixture containing formaldehyde, water and unconverted methanol, continuously introducing said gaseous mixture to a partial condensation zone maintained at a temperature within the range of from 55° to 90° C. to produce a condensed liquid consisting of formaldehyde, methanol and water, which contains at least 50% by weight of formaldehyde, continuously withdrawing the condensed liquid from the partial condensation zone, introducing one part of said withdrawn liquid to the partial condensation zone after cooling as the sole absorption solution, and introducing another part of said withdrawn liquid to a rectification zone to distill off methanol therefrom.

2. A method of simultaneously producing a highly concentrated, hot, aqueous solution of formaldehyde which can be solidified to formaldehyde polymer at room temperature and a commercial formaldehyde solution, which comprises catalytically oxidizing methanol in a conversion zone maintained at a temperature within the range of from 450° to 700° C. to form a gaseous mixture containing formaldehyde, water and unconverted methanol, continuously introducing said gaseous mixture to a partial condensation zone maintained at a temperature within the range of from 55° to 90° C. to produce a condensed liquid consisting of formaldehyde, methanol and water, which contains at least 50% by weight of formaldehyde, continuously withdrawing the condensed liquid from the partial condensation zone, introducing one part of said withdrawn liquid to the partial condensation zone after cooling as the sole adsorption solution, introducing another part of said withdrawn liquid to a rectification zone to distill off methanol therefrom, introducing a gaseous mixture, uncondensed in the partial condensation zone, to an absorbing zone to absorb formaldehyde and methanol contained in said uncondensed gaseous mixture with water supplied thereto.

References Cited in the file of this patent

UNITED STATES PATENTS

| 2,462,413 | Meath | Feb. 22, 1949 |
| 2,529,622 | Michael | Nov. 14, 1950 |
| 2,947,750 | Gerg | Aug. 2, 1960 |

OTHER REFERENCES

Walker, J. F.; Formaldehyde (1953), pp. 16, 18–20.